(12) United States Patent
Tsurumi

(10) Patent No.: US 11,302,196 B2
(45) Date of Patent: Apr. 12, 2022

(54) INFORMATION PROCESSING APPARATUS AND INFORMATION PROCESSING METHOD

(71) Applicant: Sony Corporation, Tokyo (JP)

(72) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 16/490,709

(22) PCT Filed: Feb. 23, 2018

(86) PCT No.: PCT/JP2018/006634
§ 371 (c)(1),
(2) Date: Sep. 3, 2019

(87) PCT Pub. No.: WO2018/163856
PCT Pub. Date: Sep. 13, 2018

(65) Prior Publication Data
US 2020/0005647 A1    Jan. 2, 2020

(30) Foreign Application Priority Data

Mar. 10, 2017 (JP) .............................. JP2017-045768

(51) Int. Cl.
*G08G 1/16* (2006.01)
*B60W 30/09* (2012.01)
(Continued)

(52) U.S. Cl.
CPC ............ *G08G 1/166* (2013.01); *B60W 30/09* (2013.01); *G05D 1/0088* (2013.01);
(Continued)

(58) Field of Classification Search
CPC .... G08G 1/166; G08G 1/0112; G08G 1/0133; G08G 1/04; G08G 1/096844;
(Continued)

(56) References Cited

U.S. PATENT DOCUMENTS 6,161,071 A * 12/2000 Shuman ................. B60K 28/06
340/436
8,744,744 B2 * 6/2014 Takagi ................... G01S 13/931
701/301

(Continued)

FOREIGN PATENT DOCUMENTS

CN        203346749 U      12/2013
CN        105946867 A       9/2016
(Continued)

OTHER PUBLICATIONS

International Search Report and English translation thereof dated Apr. 24, 2018 in connection with International Application No. PCT/JP2018/006634.

*Primary Examiner* — John A Tweel, Jr.
(74) *Attorney, Agent, or Firm* — Wolf, Greenfield & Sacks, P.C.

(57) ABSTRACT

The present technology relates to an information processing apparatus and an information processing method enabling a vehicle to readily pass an oncoming vehicle in a narrow road or the like. The information processing apparatus includes a map generating section generating map data associated with a circumference of a vehicle, and updating the map data in conformity with a movement of the vehicle, and a waiting space detecting section detecting a waiting space enabling the vehicle to wait on the basis of the map data, and generating waiting space information as information associated with the detected waiting space and used in setting of an escaping route on which the vehicle is escaped in order to pass an oncoming vehicle. The present technology, for example, can be applied to a vehicle controlling system which performs control of automatic driving.

15 Claims, 7 Drawing Sheets

(51) Int. Cl.
*G08G 1/0968* (2006.01)
*G05D 1/00* (2006.01)
*G08G 1/01* (2006.01)
*G08G 1/04* (2006.01)

(52) U.S. Cl.
CPC ......... *G08G 1/0112* (2013.01); *G08G 1/0133* (2013.01); *G08G 1/04* (2013.01); *G08G 1/096844* (2013.01); *G08G 1/162* (2013.01); *B60W 2554/00* (2020.02); *B60W 2556/45* (2020.02)

(58) Field of Classification Search
CPC . G08G 1/162; G08G 1/096791; B60W 30/09; B60W 2556/45; G01C 21/34
USPC .......................................................... 701/25
See application file for complete search history.

(56) References Cited

U.S. PATENT DOCUMENTS

| | | | |
|---|---|---|---|
| 11,008,002 B2* | 5/2021 | Toda | B60W 50/14 |
| 11,036,235 B2* | 6/2021 | Ishikawa | G06K 9/00798 |
| 2019/0193727 A1* | 6/2019 | Noda | B60W 10/184 |

FOREIGN PATENT DOCUMENTS

| | | |
|---|---|---|
| JP | 2004-245610 A | 9/2004 |
| JP | 2006-205348 A | 8/2006 |
| JP | 2006-267005 A | 10/2006 |
| JP | 2012-108047 A1 | 6/2012 |
| JP | 2014-137743 A | 7/2014 |
| JP | 2016-143137 A | 8/2016 |

* cited by examiner

INFORMATION PROCESSING APPARATUS AND INFORMATION PROCESSING METHOD

CROSS-REFERENCE TO RELATED APPLICATIONS

This application claims the benefit under 35 U.S.C. § 371 as a U.S. National Stage Entry of International Application No. PCT/JP2018/006634, filed in the Japanese Patent Office as a Receiving Office on Feb. 23, 2018, which claims priority to Japanese Patent Application Number JP2017-045768, filed in the Japanese Patent Office on Mar. 10, 2017, each of which is hereby incorporated by reference in its entirety.

TECHNICAL FIELD

The present technology relates to an information processing apparatus and an information processing method, and more particularly, to an information processing apparatus and an information processing method enabling a vehicle to readily pass an oncoming vehicle in a narrow road or the like.

BACKGROUND ART

In the past, a technology has been proposed in which an occupancy grid map (hereinafter referred to as an OGM) is updated in real time, and self-driving is performed by using the updated OGM without using a three-dimensional highly accurate map (e.g., refer to PTL 1).

In addition, in the past, it has been proposed that an information processing center receives the OGMs from vehicles and synthesizes the received OGMs with one another to generate a synthetic OGM which covers a broad range of an area, and presents the resulting synthetic OGM to each of the vehicles (e.g., refer to PTL 2).

CITATION LIST

Patent Literature

[PTL 1]
Japanese Patent Laid-Open No. 2006-205348
[PTL 2]
Japanese Patent Laid-Open No. 2014-137743

SUMMARY

Technical Problem

However, in the inventions described in PTL 1 and PTL 2, a method of causing the own vehicle to pass the oncoming vehicle in the narrow road or the like is not studied.

The present technology has been made in the light of such a situation, and enables a vehicle to readily pass an oncoming vehicle in a narrow road or the like.

Solution to Problem

An information processing apparatus of an aspect of the present technology includes: a map generating section generating map data associated with a circumference of a vehicle, and updating the map data in conformity with a movement of the vehicle; and a waiting space detecting section detecting a waiting space as a space enabling the vehicle to wait on a basis of the map data, and generating waiting space information as information associated with the detected waiting space and used in setting of an escaping route on which the vehicle is escaped in order to pass an oncoming vehicle.

The waiting space detecting section may detect the waiting space in a road in which it is difficult to pass the oncoming vehicle.

The waiting space detecting section, after the vehicle passes the road, may erase the waiting space information associated with the waiting space in the road.

The information processing apparatus may further include an action planning section setting the escaping route on the basis of the waiting space information.

The action planning section may set the escaping route further on the basis of the map data.

The waiting space detecting section may store the waiting space information associated with a plurality of the waiting spaces, and the action planning section may select the waiting space enabling the vehicle to pass the oncoming vehicle, from the plurality of the waiting spaces.

The information processing apparatus may further include an operation controlling section controlling the vehicle in such a way as to cause the vehicle to pass the escaping route to be escaped in the waiting space.

The action planning section may perform control so as to notify in advance that the vehicle is to be escaped.

The information processing apparatus may further include a communication section communicating with the oncoming vehicle and the action planning section may decide which of the vehicle and the oncoming vehicle is to be escaped between the vehicle and the oncoming vehicle.

The action planning section may decide whether or not escape is performed in accordance with an inputted instruction.

The map generating section and the waiting space detecting section may perform update or erasure of the map data or the waiting space information at independent timings.

The map data may include a map within a predetermined range with the vehicle as a reference.

The map data may be an occupancy grid map.

An information processing method of an aspect of the present technology includes: a map generating step of generating map data associated with a circumference of a vehicle, and updating the map data in conformity with a movement of the vehicle; and a waiting space detecting step of detecting a waiting space as a space enabling the vehicle to wait on a basis of the map data, and generating waiting space information as information associated with the detected waiting space and used in setting of an escaping route on which the vehicle is escaped in order to pass an oncoming vehicle.

In the aspect of the present technology, the map data associated with the circumference of the vehicle is generated, and the map data is updated in conformity with the movement of the vehicle. The waiting space as the space enabling the vehicle to wait is detected on the basis of the map data, and the waiting space information as the information associated with the detected waiting space and used in setting of the escaping route on which the vehicle is escaped in order to pass the oncoming vehicle is generated.

Advantageous Effect of Invention

According to an aspect to the present technology, it becomes possible to readily pass an oncoming vehicle in a narrow road or the like.

It should be noted that the effect described here is by no means necessarily limited, and any one of the effects described in the present disclosure may be offered.

DESCRIPTION OF EMBODIMENTS

Hereinafter, modes for carrying out the invention (hereinafter referred to as "embodiments") will be described in detail with reference to the drawings. It should be noted that the description will now be given in accordance with the following order.

1. Embodiments
2. Modifications
3. Others

1. EMBODIMENTS

Example of Configuration of Vehicle Controlling System

Figure 1:
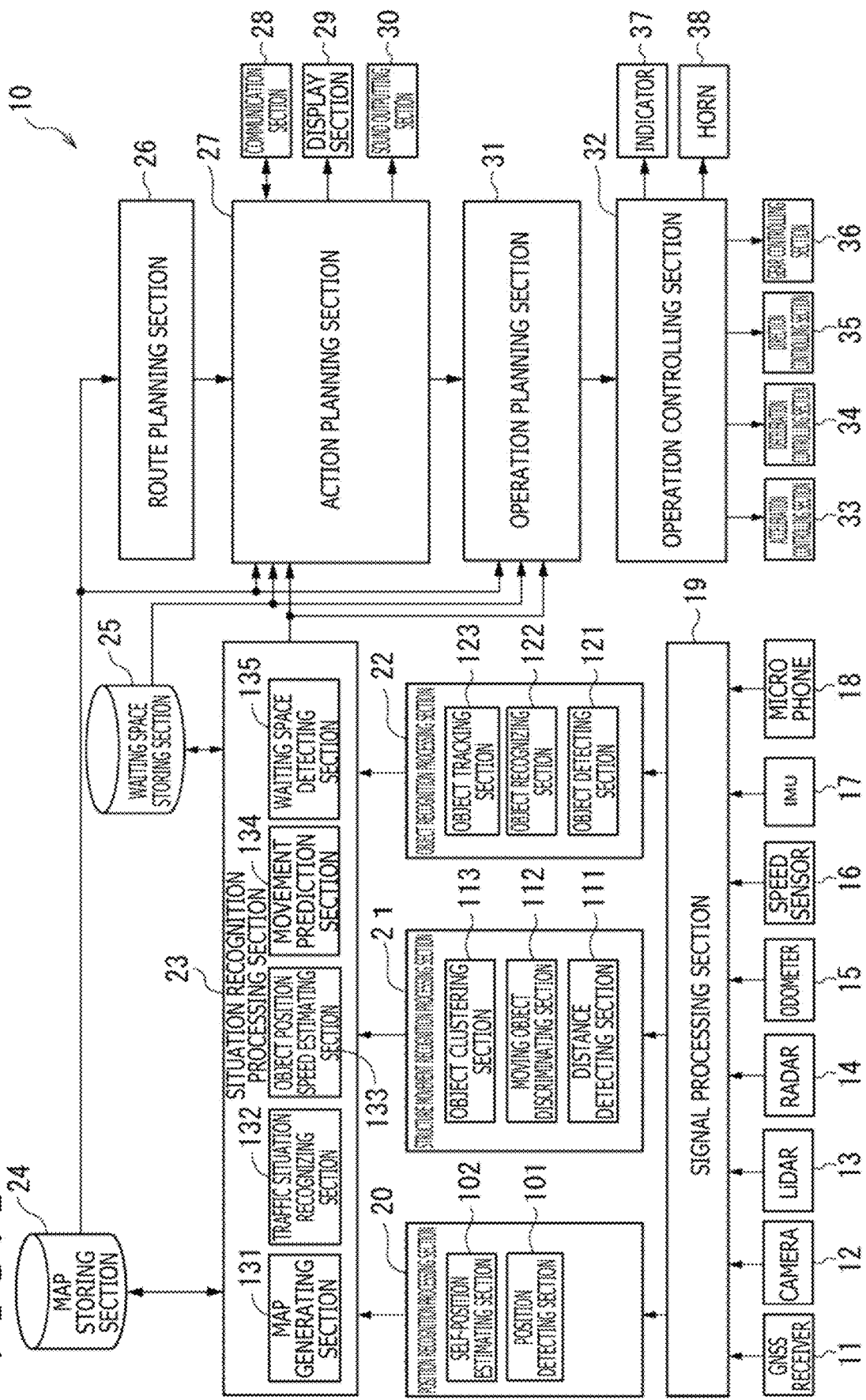
FIG. 1 is a block diagram depicting an embodiment of a vehicle controlling system to which the present technology is applied.

FIG. 1 depicts an example of a configuration of a vehicle controlling system 10 to which the present technology is applied.

The vehicle controlling system 10 is provided in a vehicle and performs control for automatic driving of the vehicle. It should be noted that the automatic driving by the control of the vehicle controlling system 10 may be configured such that only a part of a driving operation of the vehicle is automated.

It should be noted that in the case where the vehicle having the vehicle controlling system 10 provided therein is distinguished from other vehicle, the vehicle of interest is referred to as an own vehicle.

The vehicle controlling system 10 includes a GNSS (Global Navigation Satellite System) receiver 11, a camera 12, a LiDAR 13, a radar 14, an odometer 15, a speed sensor 16, an IMU (Inertial Measurement Unit) 17, a microphone 18, a signal processing section 19, a position recognition processing section 20, and a structure movement recognition processing section 21, an object recognition processing section 22, and a situation recognition processing section 23. In addition, the vehicle controlling system 10 further includes a map storing section 24, a waiting space storing section 25, a route planning section 26, an action planning section 27, a communication section 28, a display section 29, a sound outputting section 30, an operation planning section 31, an operation controlling section 32, an acceleration controlling section 33, a deceleration controlling section 34, a direction controlling section 35, a gear controlling section 36, an indicator 37, and a horn 38.

The GNSS receiver 11 receives a GNSS signal from a GNSS satellite, and supplies the received GNSS signal to the signal processing section 19.

The camera 12 performs photographing of a traveling direction of the own vehicle, a circumference of the own vehicle other than the traveling distance, or a driver who drives the own vehicle, and the like. The camera 12 supplies an image signal obtained as a result of photographing to the signal processing section 19.

The LiDAR 13 emits a laser beam and receives a reflected beam of the laser beam, whereby the LiDAR 13 detects an object or the like of the circumference of the own vehicle, and detects a distance to the object or the like. The LiDAR 13 supplies a signal indicating a detection result to the signal processing section 19.

The radar 14 emits an electric wave and receives a reflected wave of the electric wave, whereby the radar 14 detects an object or the like of the circumference of the own vehicle, and detects a distance to the object or the like. The radar 14 supplies a signal indicating a detection result to the signal processing section 19.

The odometer 15 measures the number of rotations of an axle of the own vehicle, and supplies a signal indicating a measurement result to the signal processing section 19.

The speed sensor 16 measures a speed of the own vehicle, and supplies a signal indicating a measurement result to the signal processing section 19.

The IMU 17 measures an angular velocity, an acceleration, and the like in a three-axis direction of the own vehicle, and supplies a signal indicating a measurement result to the signal processing section 19.

The microphone 18, for example, detects a sound such as a voice of a passenger in the own vehicle, and supplies a sound signal indicating the detected sound to the signal processing section 19.

The signal processing section 19 executes necessary pieces of signal processing for the respective signals from the GNSS receiver 11, the camera 12, the LiDAR 13, the radar 14, the odometer 15, the speed sensor 16, the IMU 17, and the microphone 18. Then, the signal processing section 19 supplies the signals after execution of the necessary pieces of signal processing to the position recognition processing section 20, the structure movement recognition processing section 21, and the object recognition processing section 22.

The position recognition processing section 20 executes processing for recognizing the position of the own vehicle on the basis of the signal or the like supplied from the signal processing section 19. The position recognition processing section 20 includes a position detecting section 101 and a self-position estimating section 102.

The position detecting section 101 detects a current position of the own vehicle on the basis of the GNSS signal.

The self-position estimating section 102 estimates of the movement and posture of the own vehicle on the basis of signals or the like from the camera 12, the LiDAR 13, the radar 14, the odometer 15, the speed sensor 16, and the IMU 17. In addition, the self-position estimating section 102 performs correction of the detection result of the position detecting section 101 on the basis of the estimated result of the movement and posture of the own vehicle. The self-position estimating section 102 supplies the estimated results of the current position, movement and posture of the own vehicle to the situation recognition processing section 23.

The structure movement recognition processing section 21 executes processing for recognizing the structure and movement of the circumference of the own vehicle on the basis of the signals or the like supplied from the signal processing section 19. The structure movement recognition processing section 21 includes a distance detecting section 111, a moving object discriminating section 112, and an object clustering section 113.

The distance detecting section 111 performs depth sensing on the basis of the signals or the like from the camera 12, the LiDAR 13 and the radar 14. Specifically, the distance detecting section 111 detects a distance to an object in the circumference of the own vehicle. The distance detecting section 111 supplies a detection result to the situation recognition processing section 23.

The moving object discriminating section 112 performs the discrimination between an area in which the moving object is present and an area in which the moving object is absent in the circumference of the own vehicle on the basis of the detection result of the distance detecting section 111. The moving object discriminating section 112 supplies the discrimination result to the situation recognition processing section 23.

The object clustering section 113 performs the clustering of the area in which the object is present in the circumference of the own vehicle on the basis of the detection results of the distance detecting section 111 and the moving object detecting section 112. Specifically, the object clustering section 113 individually detects the area in which the object is present for each object in the circumference of the own vehicle. The object clustering section 113 supplies a result of the clustering to the situation recognition processing section 23.

The object recognition processing section 22 executes the processing for recognizing the object in the circumference of the own vehicle. It should be noted that the object in the circumference of the own vehicle includes a road, a pavement marking, a character, a symbol, and the like on a road surface. The object recognition processing section 22 includes an object detecting section 121, an object recognizing section 122, and an object tracking section 123.

The object detecting section 121 detects an object in the circumference of the own vehicle on the basis of the signals or the like from the camera 12, the LiDAR 13, and the radar 14.

The object recognizing section 122 recognizes a kind of an object detected by the object detecting section 121 on the basis of the signals or the like from the camera 12, the LiDAR 13 and the radar 14.

The object tracking section 123 tracks the object recognized by the object recognizing section 122 on the basis of the signals or the like from the camera 12, the LiDAR 13 and the radar 14. The object tracking section 123 supplies the recognition result and tracking result of the object to the situation recognition processing section 23.

It should be noted that the details of the area in which the objects are present are not detected by the object recognizing processing section 22, but as described above, are detected by the structure movement recognition processing section 21.

The situation recognition processing section 23 executes processing for recognizing the situation of the own vehicle and the circumference. The situation recognition processing section 23 includes a map generating section 131, a traffic situation recognizing section 132, an object position speed estimating section 133, a movement prediction section 134, and a waiting space detecting section 135.

The map generating section 131 generates the OGM on the basis of the results of the recognition processing of the position recognition processing section 20, the structure movement recognition processing section 21, and the object recognition processing section 22, and performs the control of storing of the generated OGM in the map storing section 24.

Here, in the OGM, for example, an area within a predetermined range (e.g., within the range of 100 m×100 m with the own vehicle as a center) with the own vehicle as a reference is divided in a grid shape, and a value indicating whether or not a stationary object is present is set for each square. For example, 1 is set to the square in which the stationary object is present, and 0 is set to the square in which the stationary object is absent. In addition, a value in the range of 0 to 1 according to the probability that the stationary object is present is set to the square in which it is not sure whether or not the stationary object is present.

In addition, the map generating section 131 suitably updates the OGM according to the movement of the own vehicle, causes the map storing section 24 to store the updated OGM, and erases the old OGM from the map storing section 24.

The traffic situation recognizing section 132 recognizes a traffic situation of the circumference of the own vehicle on the basis of the results of the recognition processing of the position recognition processing section 20, the structure movement recognition processing section 21, and the object recognition processing section 22, as well as a global map which is previously stored in the map storing section 24. The traffic situation recognizing section 132 supplies the recognition results to the action planning section 27 and the operation planning section 31.

Here, the global map is a map of a wide area having such accuracy that the global map is used in a car navigation system, and is mainly used in the setting of the route until the own vehicle reaches a destination. For example, the information associated with a road, facilities of the circumference of the road, a signal, a traffic sign, an address, and the like is registered in the global map.

In addition, the traffic situation, for example, is represented by a configuration and a state of a road in the circumference of the own vehicle, a traffic rule indicated by a traffic sign, marking, or the like of the road, a state of traffic lights, or the like.

The object position speed estimating section 133 estimates the position and speed of the object in the circumference of the own vehicle on the basis of the results of the recognition processing in the structure movement recognition processing section 21 and the object recognition processing section 22, and supplies the estimated results to the action planning section 27 and the operation planning section 31.

The movement prediction section 134 predicts the movement of the object in the circumference of the own vehicle on the basis of the results of the recognition processing for the structure movement recognition processing section 21 and the object recognition processing section 22, and supplies the predicted results to the action planning section 27 and the operation planning section 31.

The waiting space detecting section 135 performs the detection of the waiting space on the basis of the OGM and the size of the own vehicle. Here, the waiting space, for example, is a space enabling the own vehicle to wait in order to pass the oncoming vehicle in the narrow road or the like. In addition, the waiting space detecting section 135 generates waiting space information indicating the detection result of the waiting space, and setting an escaping route for passing the oncoming vehicle, and performs the control for storing of the waiting space information in the waiting space storing section 25. Incidentally, the waiting space detecting section 135 performs the update or erasure of the waiting space information independently of the timing at which the map generating section 131 updates or erases the OGM.

The route planning section 26 plans a global route on which the own vehicle will travel (hereinafter referred to as a traveling route) on the basis of the global map stored in the map storing section 24, and an instruction about a destination or the like inputted by a driver or the like. The route planning section 26 supplies information indicating the planned traveling route to the action planning section 27.

The action planning section 27 plans the action of the own vehicle on the basis of the result of the recognition processing of the situation recognition processing section 23, the traveling route, the global map and the OGM which are stored in the map storing section 24, and the waiting space information stored in the waiting space storing section 25. Here, the action of the own vehicle, for example, is decided by start, stop, traveling direction (e.g., forward, reverse, left turn, right turn, change in direction, or the like) the lane on which the own vehicle travels, the traveling speed, or the like. The action planning section 27 supplies the information indicating the action of the own vehicle thus planned to the operation planning section 31.

In addition, the action planning section 27 communicates with the other vehicle via the communication section 28, and performs the notification of the action of the own vehicle, the detection of the action of other vehicle, the mediation in action between the own vehicle and other vehicle, or the like.

Moreover, the action planning section 27 notifies the passenger including the driver, or the vehicle in the circumference of the own vehicle, of the action of the own vehicle.

The communication section 28, for example, includes a communication apparatus which performs the vehicle-to-vehicle communication through wireless communication, and performs the communication with the vehicle in the circumference of the own vehicle.

The display section 29, for example, includes one or more display apparatuses such as displays. In addition, the display may be not only one which displays a video or the like on a screen, but also one, such as a head up display or a transmission type display, which displays a video or the like within a field of view of a driver. Moreover, it is possible to cause the display section 29 to display thereon a video or the like not only toward a passenger in the own vehicle, but also toward the circumference of the own vehicle.

The sound outputting section 30, for example, includes one or more devices each of which outputs the sound such as a speaker or a buzzer.

The operation planning section 31 plans the operation of the own vehicle for realizing the action planned by the action planning section 27 on the basis of the result of the recognition processing of the situation recognition processing section 23, the OGM stored in the map storing section 24, and the waiting space information stored in the waiting space storing section 25. Here, the operation of the own vehicle, for example, is the control or the like for the acceleration, the deceleration, and the traveling direction. The operation planning section 31 supplies the information indicating the operation of the own vehicle thus planned to the operation controlling section 32.

The operation controlling section 32 performs the control for the own vehicle in order to perform the operation planned by the operation planning section 31 via the acceleration controlling section 33, the deceleration controlling section 34, the direction controlling section 35, and the gear controlling section 36. It should be noted that, although an arbitrary method can be adopted as the control method, for example, PID (Proportional-Integral-Differential) control is used. In addition, the operation controlling section 32, if necessary, displays the operation or state of the own vehicle by the indicator 37, or sounds the horn 38.

The acceleration controlling section 33 performs the acceleration control for the own vehicle. For example, in the case where the own vehicle is driven by an engine, the acceleration controlling section 33 performs the acceleration control by controlling a throttle. In addition, for example, in the case where the own vehicle is driven by a motor, the acceleration controlling section 33 performs the acceleration control by controlling an inverter which supplies an electric power to the motor.

The deceleration controlling section 34 performs the deceleration control for the own vehicle by controlling a brake.

The direction controlling section 35 controls the traveling direction of the own vehicle by controlling a steering.

The gear controlling section 36 controls a gear of the own vehicle.

The indicator 37, for example, includes an instrument panel, a lamp, or the like which is provided in the own vehicle.

The horn 38 includes a car horn provided in the own vehicle.

First Embodiment of Passing Controlling Processing

Next, a description will be given with respect to a first embodiment of passing controlling processing which is executed by the vehicle controlling system 10 with reference to a flow chart of FIG. 2. It should be noted that this processing, for example, is started when a power (ignition) switch of the vehicle is turned ON. In addition, this processing, for example, is ended when the power (ignition) switch of the vehicle is turned OFF.

In Step S1, the vehicle controlling system 10 starts to execute traveling processing toward a destination.

Specifically, the sections of the vehicle controlling system 10 start to execute predetermined pieces of processing, respectively.

Then, the route planning section 26 plans a traveling route of the own vehicle on the basis of an instruction with respect to a global map stored in the map storing section 24, and a destination or the like inputted by a driver or the like. In addition, the route planning section 26 starts to execute processing for suitably changing the traveling route depending on a situation of the weather, the traffic jam, the road construction, or the like. Moreover, the route planning section 26 starts to perform the supply of the information indicating the planned traveling route to the action planning section 27.

The action planning section 27 starts to execute the processing for planning the action of the own vehicle for traveling toward the destination on the basis of the result of the recognition processing of the situation recognition processing section 23, the traveling route, the global map and OGM which are started in the map storing section 24, and the waiting space information stored in the waiting space storing section 25. In addition, the action planning section 27 starts to perform the supply of the information indicating the action of the own vehicle thus planned to the operation planning section 31.

The operation planning section 31 starts to execute the processing for planning the operation of the own vehicle for realizing the action planned by the action planning section 27 on the basis of the result of the recognition processing of the situation recognition processing section 23, the OGM which is stored in the map storing section 24, and the waiting space information stored in the waiting space storing section 25. In addition, the operation planning section 31 starts to execute the processing for supplying the information indicating the operation of the own vehicle thus planned to the operation controlling section 32.

The operation controlling section 32 starts to perform the control for the own vehicle in order to realize the operation planned by the operation planning section 31 via the acceleration controlling section 33, the deceleration controlling section 34, the direction controlling section 35, and the gear controlling section 36.

As a result, the own vehicle starts to move toward the destination.

In Step S2, the map generating section 131 starts to generate the OGM. Specifically, the map generating section 131 generates the OGM on the basis of the results of the recognition processing in the position recognition processing section 20, the structure movement recognition processing section 21, and the object recognition processing section 22, and causes the map storing section 24 to store the generated OGM. In addition, the map generating section 131 starts to execute the processing for suitably updating the OGM in conformity with the movement of the own vehicle, causing the map storing section 24 to store the updated OGM, and erasing the old OGM from the map storing section 24.

In Step S3, the waiting space detecting section 135 decides whether or not the own vehicle is traveling on the road on which the own vehicle is difficult to pass the oncoming vehicle. For example, the waiting space detecting section 135 detects a width of the road on which the own vehicle is traveling.

It should be noted that, at this time, for example, a width except for an area which is regarded as a waiting space which will be described later is desirably detected as the road width. For example, in the case of the road in which a waiting place is provided, a width except for the waiting place is desirably detected. In addition, for example, in the case where there is an area in the road for which it may be difficult to pass due to the construction, the lane regulation, or the like, the width except for this area is detected as the road width. In addition, in the case where, even in an area which is not maintained such that the vehicle can travel, this area can be regarded as the area in which the vehicle can travel, a width of the area is detected as the road width.

Then, in the case where the detected road width is smaller than a predetermined threshold value, the waiting space detecting section 135 decides that the own vehicle is traveling on a road on which the own vehicle is difficult to pass the oncoming vehicle (hereinafter this road is referred to as a passing-difficulty road), and the processing proceeds to Step S4.

It should be noted that this threshold value, for example, is set to a value obtained by adding a predetermined margin to an addition value of a vehicle width of the own vehicle, and a maximum value of the vehicle width of a vehicle for which the passing is supposed.

In Step S4, the waiting space detecting section 135 searches for a waiting space. For example, the waiting space detecting section 135 searches for a space enabling the own vehicle to wait, and such a space to achieve, in the case of causing the own vehicle to wait in this space, a width of an area in which the oncoming vehicle can pass being equal to or larger than a predetermined threshold value. This predetermined threshold value, for example, is set to the value obtained by adding a predetermined margin to a minimum value of the vehicle width of the vehicle for which the passing is supposed.

As a result, for example, the space which is provided for the purpose of waiting or parking the vehicle like a waiting place, an emergency parking area, or a parking lot is detected as the waiting space. In addition, for example, a road branching from the road in which the own vehicle is traveling is detected as the waiting space. Further, for example, a free space adjacent to the road in which the own vehicle is traveling is detected as the waiting space.

Figure 3:
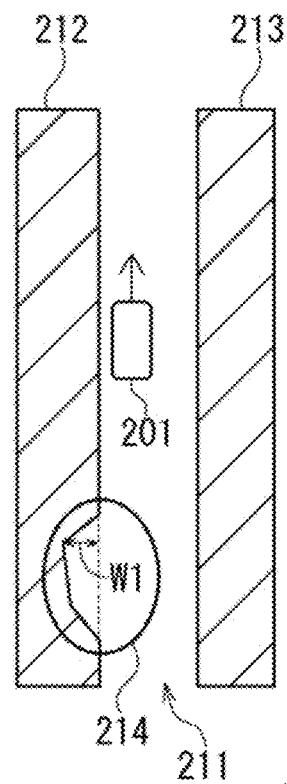
FIG. 3 is a view depicting an example of a waiting space.

FIG. 3 depicts an example of the waiting space. In this example, an own vehicle 201 is traveling in a road 211 which is sandwiched between an obstacle 212 and an obstacle 213. Then, a waiting space 214 adjacent to the left side of the road 211 is detected as the waiting space.

It should be noted that, since it is sufficient that the own vehicle can pass the oncoming vehicle, a width, of the waiting space, from an edge of the road is not necessarily equal to or larger than the width of the own vehicle. For example, a width W1, of the waiting space 214 of FIG. 3, from the left end of the road 221 is not necessarily equal to or larger than the width of the own vehicle 201.

In addition, a stop direction of the own vehicle in the waiting space 214 is not particularly limited. For example, not only a space in which the own vehicle is stopped in a direction approximately parallel to the road in which the own vehicle is traveling, but also a space in which the own vehicle is stopped in a direction approximately vertical to the road in which the own vehicle is traveling can be detected as the waiting space.

Moreover, the waiting space can be detected not only on the side on which the own vehicle travels, but also on a side opposite to that side. For example, in the case of a country in which drivers keep to the left side of the road, the waiting space can be detected not only on the left side of the road, but also on the right side of the road.

Incidentally, in the case where there is no waiting space within a section of the passing-difficulty road, in order that the own vehicle may pass the oncoming vehicle, there is supposed the case where the own vehicle goes back from an entrance of the passing-difficulty road up to the outside. Therefore, in the case, the road having the large width in front of the entrance of the passing-difficulty road is desirably detected as the waiting space.

In Step S5, the waiting space detecting section 135 decides whether or not the waiting space is found. In the case where the waiting space detecting section 135 decides that the waiting space is found, the processing proceeds to Step S6.

In Step S6, the waiting space detecting section 135 registers the waiting space. Specifically, the waiting space detecting section 135 generates waiting space information associated with the detected waiting space and causes the waiting space storing section 25 to store the waiting space information.

Here, the waiting space information, for example, includes the information associated with the position of the waiting space, the width of the vehicle with which passing is possible, and the stop direction in the waiting space.

The position of the waiting space may be expressed, in the form of the absolute position, like the latitude and the longitude, or may be expressed by the relative position from the own vehicle. It should be noted that, in the case where the position of the position of the waiting space is expressed by the relative position from the own vehicle, the position of the waiting space is updated at any time in conformity with the movement of the own vehicle.

The width of the vehicle at which the passing is possible indicates a maximum value of the width of the vehicle at which the passing is possible in the case where the own vehicle is escaped to the waiting space.

The stop direction in the waiting space indicates a stop direction which is recommended for the road in the case where the own vehicle is stopped in the waiting space.

It should be noted that there may be provided a restriction on the number of registration of the waiting spaces, or vice versa. In case of the former, for example, only the waiting space information associated with a predetermined number of waiting spaces in the order of being closer to the current position of the own vehicle is stored in the waiting space storing section 25. In addition, the waiting space information associated with the waiting space which is more distant from that in case of the above case is erased from the waiting space storing section 25. In the latter case, for example, all pieces of the waiting space information associated with the waiting space in the passing-difficulty road during traveling are stored in the waiting space storing section 25.

It should be noted that, supposing the case where the width of the waiting space is insufficient resulting from that the width of the oncoming vehicle is large and the like, or the case where the waiting space is occupied with other vehicle or the like, at least two or more waiting spaces are desirably registered.

In this manner, in the case where the own vehicle is traveling on the passing-difficulty road, the waiting space is detected in the route in which the own vehicle has passed, and the information associated with the waiting space is stored.

Thereafter, the processing proceeds to Step S7.

Meanwhile, in the case where it is decided in Step S5 that the waiting space is not found, the processing in Step S6 is skipped, and the processing proceeds to Step S7.

In Step S7, the action planning section 27 decides whether or not the oncoming vehicle comes on the basis of the estimated result of the object position estimating section 133, and the predicted result of the movement prediction section 134. In the case where it is decided that the oncoming vehicle comes, the processing proceeds to Step S8.

In Step S8, the action planning section 27 decides whether or not the own vehicle can pass the oncoming vehicle. The action planning section 27 detects a width at which the own vehicle can pass (hereinafter referred to as a passable width) in the current position on the basis of the OGM. In addition, the action planning section 27 detects the width of the oncoming vehicle on the basis of an estimated result of the object position speed estimating section 133. Then, in the case where a value obtained by subtracting a sum value of the width of the own vehicle and the width of the oncoming vehicle from the passable width is smaller than a predetermined threshold value, the action planning section 27 decides that it may be impossible for the own vehicle to pass the oncoming vehicle, and the processing proceeds to Step S9.

In Step S9, the vehicle controlling system 10 moves the own vehicle to the waiting space. For example, first, the action planning section 27 searches for the waiting space in which the own vehicle can pass the oncoming vehicle within the OGM. The action planning section 27 sets the waiting space, closest to the own vehicle, of the detected waiting spaces as a place to escape.

In contrast, in the case where the waiting space in which the own vehicle can pass the oncoming vehicle within the OGM is not found, the action planning section 27 searches for the waiting space, in which the own vehicle can pass the oncoming vehicle, of the waiting spaces registered in the waiting space storing section 25 on the basis of the width of the oncoming vehicle. Then, the action planning section 27 sets the waiting space, closest to the own vehicle, of the detected waiting spaces as the place to escape.

It should be noted that the action planning section 27 may search for the place to escape from the beginning by using the waiting space information without using the OGM.

The action planning section 27 sets the escaping route up to the set place to escape and plans the action until the own vehicle is moved to the place to escape in accordance with the set escaping route. The action planning section 27 supplies the information indicating the planned action to the operation planning section 31.

The operation planning section 31 plans the operation of the own vehicle until the own vehicle is moved to the place to escape on the basis of the result of the recognition processing of the situation recognition processing section 23, the OGM stored in the map storing section 24, and the waiting space information stored in the waiting space storing section 25. The operation planning section 31 supplies the information indicating the operation of the own vehicle thus planned to the operation controlling section 32.

The operation controlling section 32 performs the control in such a way that the own vehicle is moved to the place to escape via the acceleration controlling section 33, the deceleration controlling section 34, the direction controlling section 35, and the gear controlling section 36.

Figure 4:
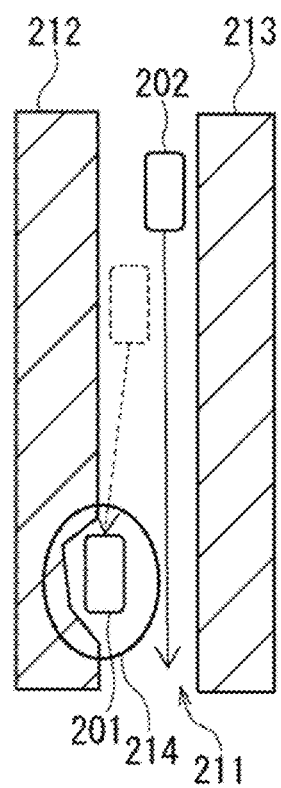
FIG. 4 is a view depicting an example of an escaping method.

As a result, for example, as depicted in FIG. 4, in the case where it may be impossible for the own vehicle 201 and an oncoming vehicle 202 to pass each other in the road 211, the own vehicle 201 is automatically escaped to the waiting space 214. As a result, the oncoming vehicle 202 can pass the own vehicle 201.

Incidentally, for example, in the case where it may be impossible for the own vehicle to stop in the place to escape resulting from the other vehicle formerly stopping and so forth, the waiting space next closest to the own vehicle, of the waiting spaces in which the own vehicle can pass the oncoming vehicle, is set as the place to escape, and the own vehicle is moved to the place to escape.

In Step S10, the action planning section 27 decides whether or not the oncoming vehicle has passed the own vehicle on the basis of the estimated result of the object position speed estimating section 133. This processing is repetitively executed until it is decided that the oncoming vehicle has passed the own vehicle. In the case where it is decided that the oncoming vehicle has passed the own vehicle, the processing proceeds to Step S11.

In Step S11, the vehicle controlling system 10 restarts to execute processing similar to that in Step S1, thereby restarting to execute the traveling processing for causing the own vehicle to move toward the destination.

Thereafter, the processing is returned back to Step S3, and the process in Step S3 and the subsequent processes after Step S3 are executed.

Meanwhile, in Step S8, in the case where a value obtained by subtracting the sum value of the width of the own vehicle and the width of the oncoming vehicle from the passable width is equal to or larger than the predetermined threshold value, the action planning section 27 decides that the own vehicle can pass the oncoming vehicle, and the processing is returned back to Step S3. Thereafter, the process in Step S3 and the subsequent processes after Step S3 are executed.

In addition, in Step S7, in the case where it is decided that the oncoming vehicle does not come, the processing is returned back to Step S3 and the process in Step S3 and the subsequent processes after Step S3 are executed.

Moreover, in Step S7, in the case where the detected road width is equal to larger than the predetermined threshold value, the waiting space detecting section 135 decides that the own vehicle is not traveling in the road in which the own vehicle is difficult to pass the oncoming vehicle, and the processing proceeds to Step S3.

In Step S12, the waiting space detecting section 135 decides whether or not the own vehicle has passed the road in which the own vehicle is difficult to pass the oncoming vehicle (passing-difficulty road). In the case where it has previously been decided in the Step S3 that the own vehicle is traveling in the passing-difficulty road, and it is currently decided in the Step S3 that the own vehicle is not traveling in the passing-difficulty road, the waiting space detecting section 135 decides that the own vehicle has passed the passing-difficulty road, and the processing proceeds to Step S13.

In Step S13, the waiting space detecting section 135 resets the registration of the waiting spaces. For example, the waiting space detecting section 135 erases all the pieces of waiting space information stored in the waiting space storing section 25. Here, the erasure of the waiting space information includes not only the erasure of the physical data, but also the case where, for example, the data is invalidated. As a result, the information associated with the waiting space in the passing-difficulty road which the own vehicle has passed is reset.

Thereafter, the processing is returned back to Step S3, and the process in Step S3 and the subsequent processes after Step S3 are executed.

Meanwhile, in the case where it is decided in Step S12 that the own vehicle has not passed the passing-difficulty road, and the processing is returned back to Step S3, and the process in Step S3 and the subsequent processes after Step S3 are executed.

As a result, it becomes possible to pass the oncoming vehicle by the automatic driving without using a highly accurate map provided from the outside (hereinafter referred to as a highly accurate map). Therefore, for example, in the case where the own vehicle is traveling on a place for which the highly accurate map is not produced, in the case where the own vehicle is traveling on a place for which the highly accurate map has not been updated for a long period of time, or in the case where it may be impossible to acquire the highly accurate map due to a communication failure or the like, it becomes possible to pass the oncoming vehicle by the automatic driving.

In addition, it becomes unnecessary to widen the area of the OGM, and lengthen a period of time for holding the OGM in order to pass the oncoming vehicle. Thus, for example, it is possible to lighten the load of processing of generating the OGM, shorten the processing time, and reduce an amount of a memory to be used.

Second Embodiment of Passing Controlling Processing

Next, a description will be given with respect to a second embodiment of the passing controlling processing which is executed by the vehicle controlling system 10 with reference to a flow chart of FIG. 5.

Figure 2:
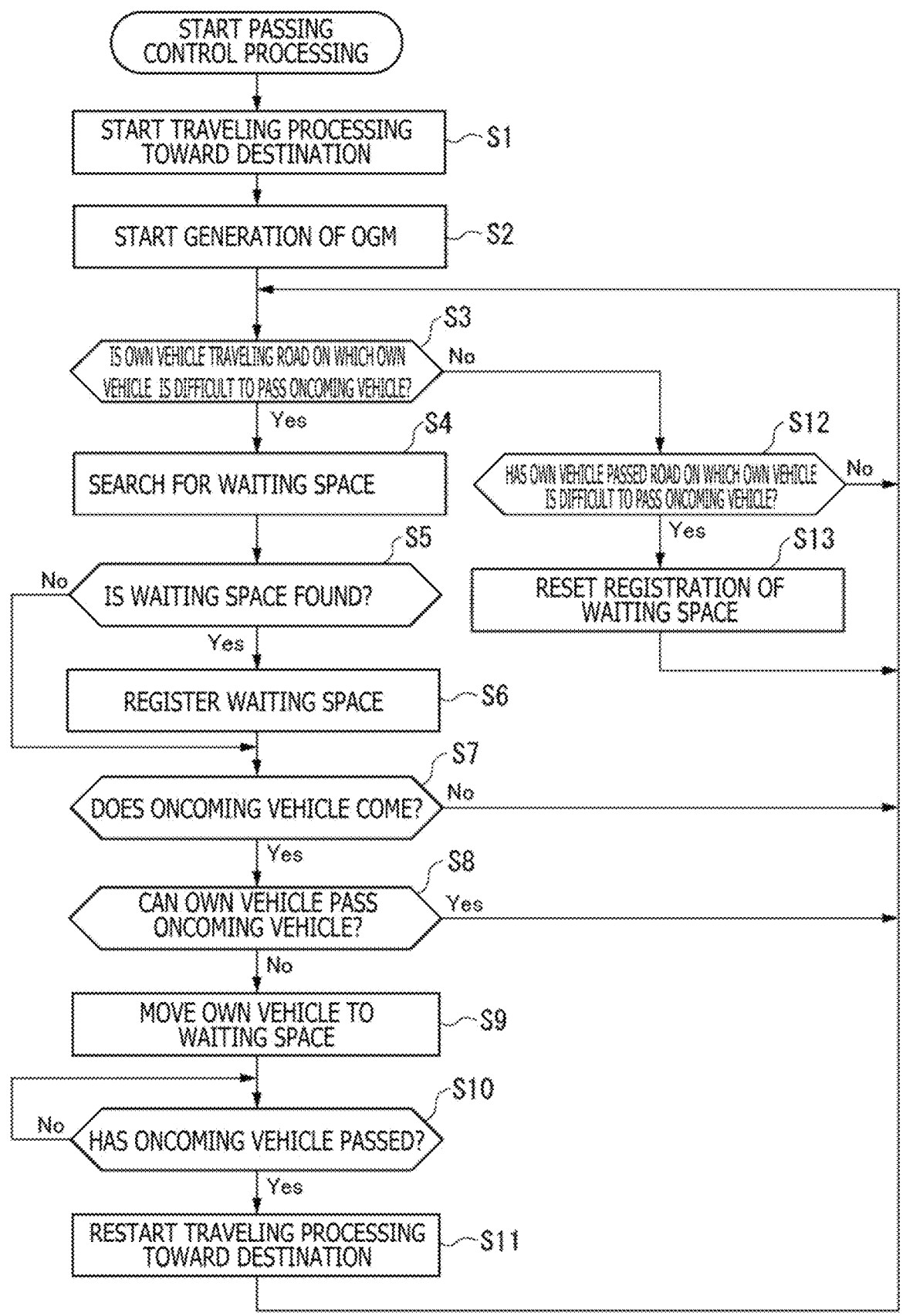
FIG. 2 is a flow chart for explaining a first embodiment of passing controlling processing.
Figure 5:
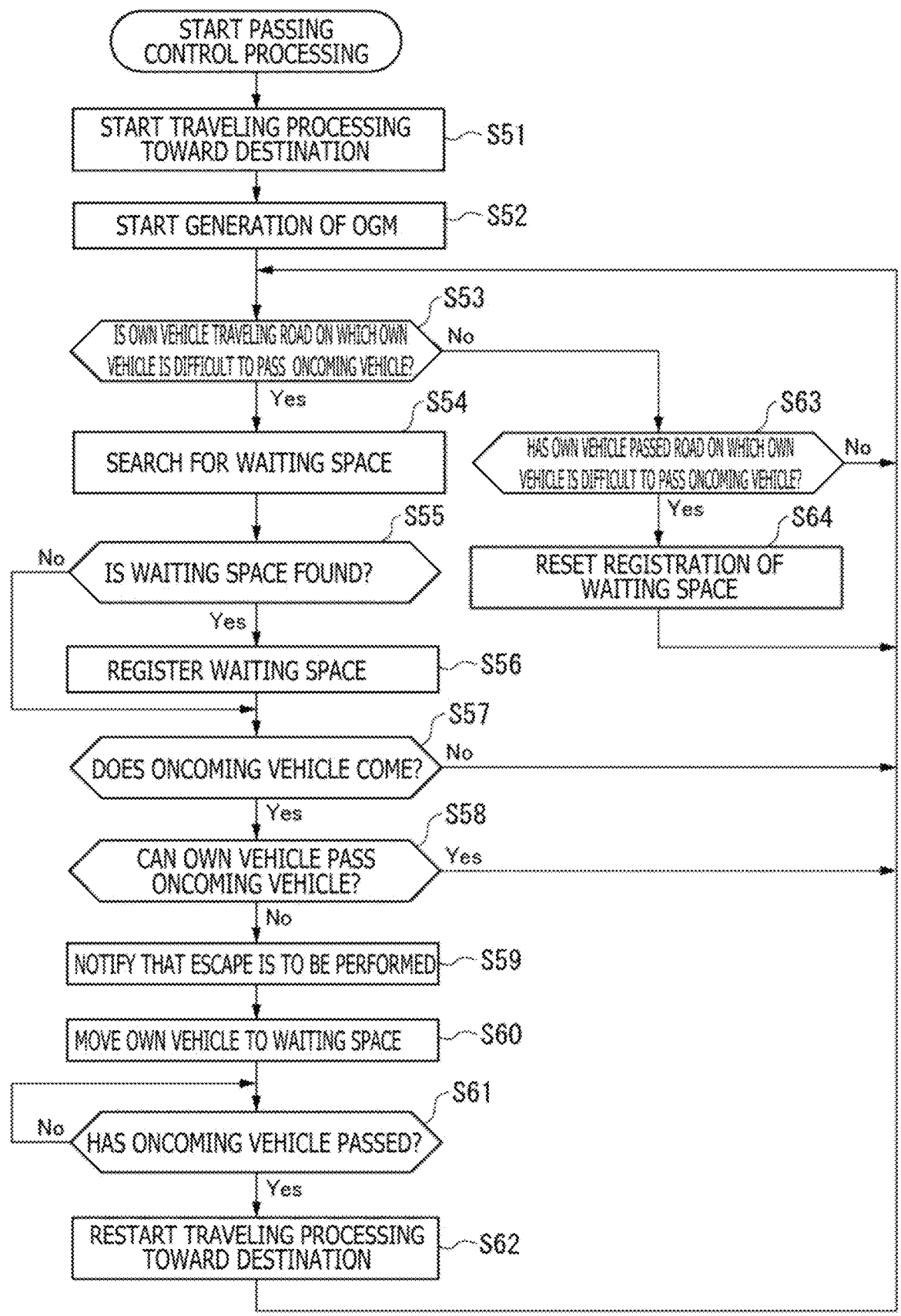
FIG. 5 is a flow chart for explaining a second embodiment of the passing controlling processing.

Comparing the flow chart of FIG. 5 with the flow chart of FIG. 2, the flow chart of FIG. 5 is different from the flow chart of FIG. 2 in that a process in Step S59 is added, and others are similar to those in FIG. 2.

Specifically, in Step S59, the action planning section 27 notifies the driver that the escape is to be performed. Specifically, the action planning section 27 visually or aurally notifies the driver that the escape is to be performed before the own vehicle is escaped via at least one of the display section 29 and the sound outputting section 30. For example, the action planning section 27 notifies the driver of the effect that the own vehicle is to be escaped in order to pass the oncoming vehicle. In addition, the position of the waiting space, the escaping route, the distance to the waiting space, a time required for escaping to the waiting space, and the like are displayed together with the map. As a result, the driver can know the movement of the own vehicle before the escape is performed, and can feel a sense of security.

It should be noted that, for example, the own vehicle may visually or aurally notify the oncoming vehicle that the escape is to be performed. For example, the headlight of the own vehicle may be flashed, the message may be displayed on an outside display, an electric bulletin board or the like, thereby notifying a driver of the effect that the own vehicle is to be escaped. As a result, the driver of the oncoming vehicle can sense the movement of the facing own vehicle to move forward in order to pass the own vehicle with a sense of security.

Third Embodiment of Passing Controlling Processing

Next, a description will be given with respect to a third embodiment of the passing controlling processing which is executed by the vehicle controlling system 10 with reference to a flow chart of FIG. 6.

Figure 6:
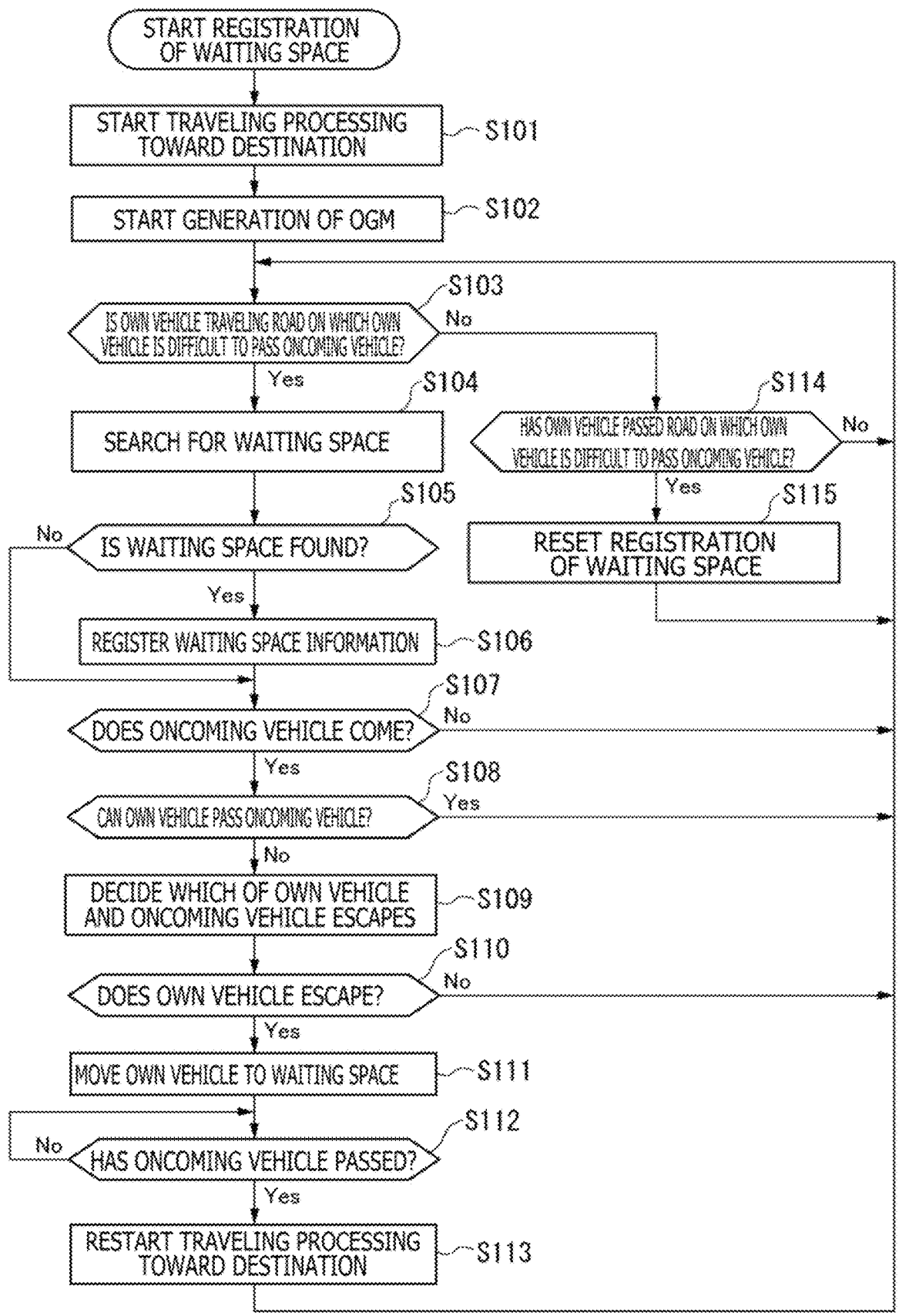
FIG. 6 is a flow chart for explaining a third embodiment of the passing controlling processing.

Comparing the flow chart of FIG. 6 with the flow chart of FIG. 2, the flow chart of FIG. 6 is different from the flow chart of FIG. 2 in that a process in Step S109 and a process in Step S110 are added, and others are the same as those of the flow chart of FIG. 2.

Specifically, in Step S109, the action planning section 27 decides which of the own vehicle and the oncoming vehicle is to be escaped between the own vehicle and the oncoming vehicle. For example, the action planning section 27 performs the wireless communication with the oncoming vehicle via the communication section 28, and decides which of the own vehicle and the oncoming vehicle is to be escaped on the basis of the information obtained from the oncoming vehicle. For example, the vehicle having a shorter distance to the waiting space, the vehicle having a more amount of remaining fuel, the vehicle having the smaller number of past traffic violations of the driver, the vehicle having a smaller vehicle body, or the like is decided as the vehicle to be escaped.

It should be noted that the method of communicating with the oncoming vehicle is by no means limited to the wireless communication. For example, the communication may be performed by using light or a sound.

In Step S108, the action planning section 27 decides whether or not the own vehicle is to be escaped. In the case where it is decided that the own vehicle is to be escaped, the processing proceeds to Step S109.

Thereafter, after the similar processes to those in Step S9 to Step S11 of FIG. 2 are executed in Step S111 to Step S113, the processing is returned back to Step S103, and the process in Step S103 and the subsequent processes after Step S103 are executed.

Meanwhile, in the case where it is decided in Step S110 that the own vehicle is not to be escaped, the processing is returned back to Step S103, and the process in Step S103 and the subsequent processes after Step S103 are executed.

As a result, for example, in the case where the oncoming vehicle includes a function of automatically controlling passing-by the oncoming vehicle similarly to the case of the own vehicle, it becomes possible to cause one of the own vehicle or the oncoming vehicle, which is easier to escape, to be escaped. As a result, safety is enhanced, and a time required for passing one another is shortened. In addition, it is prevented that both the own vehicle and the oncoming vehicle are escaped.

Fourth Embodiment of Passing Controlling Processing

Next, a description will be given with respect to a fourth embodiment of the passing controlling processing which is executed by the vehicle controlling system 10 with reference to a flow chart of FIG. 7.

Figure 7:
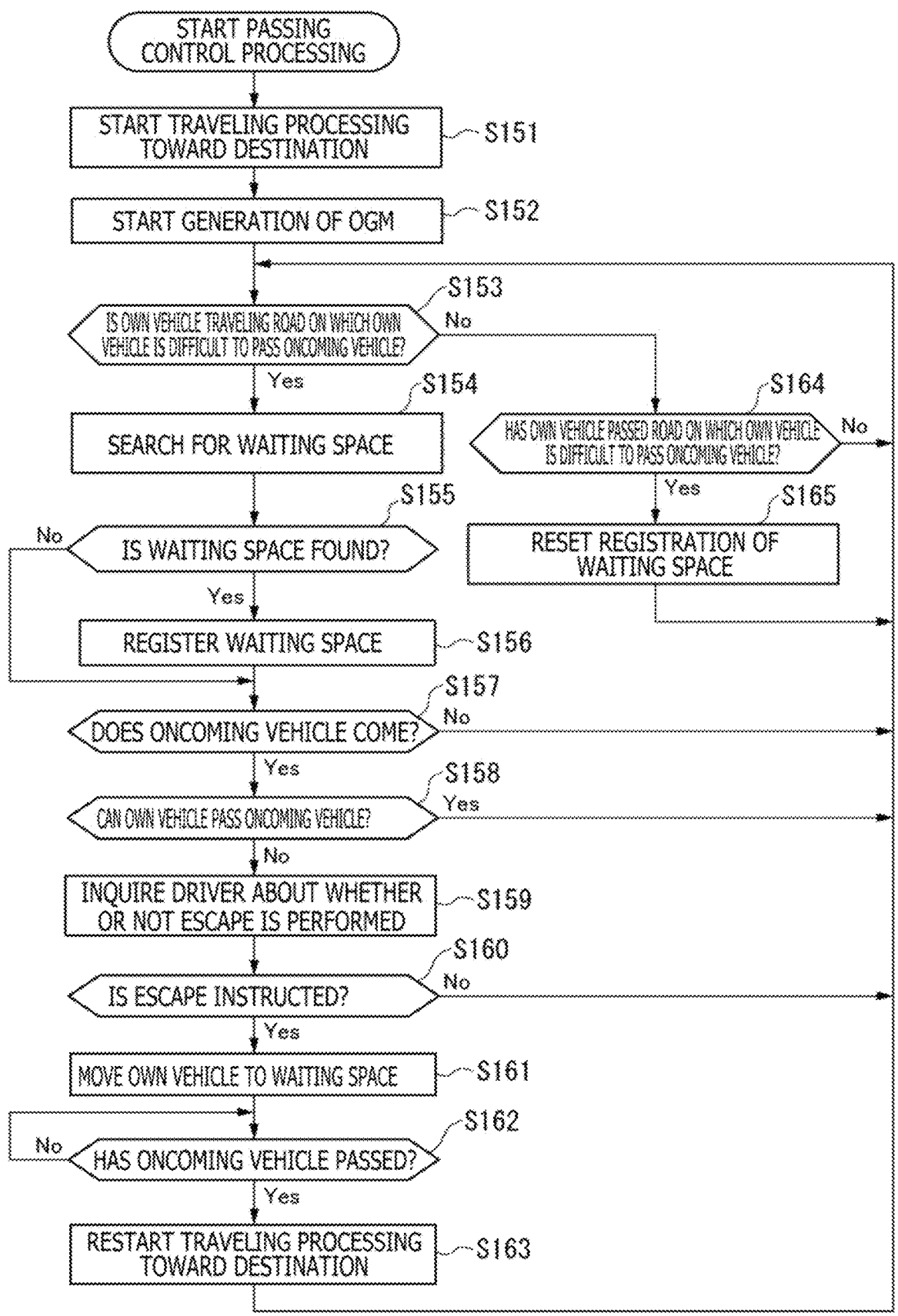
FIG. 7 is a flow chart for explaining a fourth embodiment of the passing controlling processing.

Comparing the flow chart of FIG. 7 with the flow chart of FIG. 2, the flow chart of FIG. 7 is different from the flow chart of FIG. 2 in that a process in Step S159 and a process in Step S160 are added, and others are the same as those of the flow chart of FIG. 2.

Specifically, in Step S159, the action planning section 27 inquires the driver about whether or not the escape is performed. Specifically, the action planning section 27 visually or aurally inquires the driver about whether or not the escape is performed via at least one of the display section 29 and the sound outputting section 30.

In Step S160, the action planning section 27 decides whether or not the escape is instructed. For example, in the case where the driver (or other passenger) causes the own vehicle to escape in response to the inquiry in the processing in Step S159, the driver inputs the instruction. It should be noted that a method of inputting the instruction is not particularly limited and, for example, the instruction is inputted by using a method such as a user operation via an operation section (e.g., a touch panel, a switch, a button, or the like) (not depicted), a sound command, or a gesture. Then, in the case where it is decided that the escape is instructed, the processing proceeds to Step S161.

Incidentally, for example, it may be configured such that, in the case where the own vehicle is not to be escaped, the driver or the like inputs the instruction. It may also be configured such that, in the case where the instruction is not inputted, it is decided that the escape is automatically instructed.

Thereafter, after the similar processes to those of Step S9 to Step S11 of FIG. 2 are executed in Step S161 to Step S163, the processing is returned back to Step S153, and the process in Step S153 and the subsequent processes after Step S153 are executed.

Meanwhile, in the case where it is decided in Step S160 that the escape is not instructed, the processing is returned back to Step S153, and the process in Step S153 and the subsequent processes after S153 are executed.

As a result, it becomes possible to decide whether or not the escape is performed on the basis of decision by the driver.

2. MODIFICATIONS

Hereinafter, a description will be given with respect to modifications of the embodiments of the technology according to the present disclosure described above.

For example, not only during automatic driving, but also during manual driving, generation and update of the waiting space information may be performed. Then, for example, it may be configured such that, in the case where there is generated a situation in which the own vehicle is difficult to pass the oncoming vehicle, the driver checks the waiting space information to find a suitable waiting space, and escapes the own vehicle by the manual driving. Alternatively, it may be configured such that, in the case where there is generated a situation in which the own vehicle is difficult to pass the oncoming vehicle, the driver switches a mode over to an automatic driving mode so as to cause the own vehicle to pass the oncoming vehicle by the automatic driving.

In addition, for example, it may be configured such that, even after the passing of the passing-difficulty road, the waiting space information associated with the passing-difficulty road is held and the waiting space information associated with the passing-difficulty road is to be used in an opportunity in which the own vehicle travels on that road next time.

Further, for example, it may be configured such that, in the case the detected waiting space exists in a dangerous place in which the detected waiting space is located on the edge of the cliff, and so forth, that waiting space is not be registered.

3. OTHERS

Example of Configuration of Computer

The series of processing described above can be executed by hardware, or can be executed by software. In the case where the series of processing are executed by the software, a program composing the software is installed in a computer. Here, the computer includes a computer incorporated in a dedicated hardware, for example, a general-purpose personal computer which can carry out various kinds of functions by installing various kinds of programs, and the like.

Figure 8:
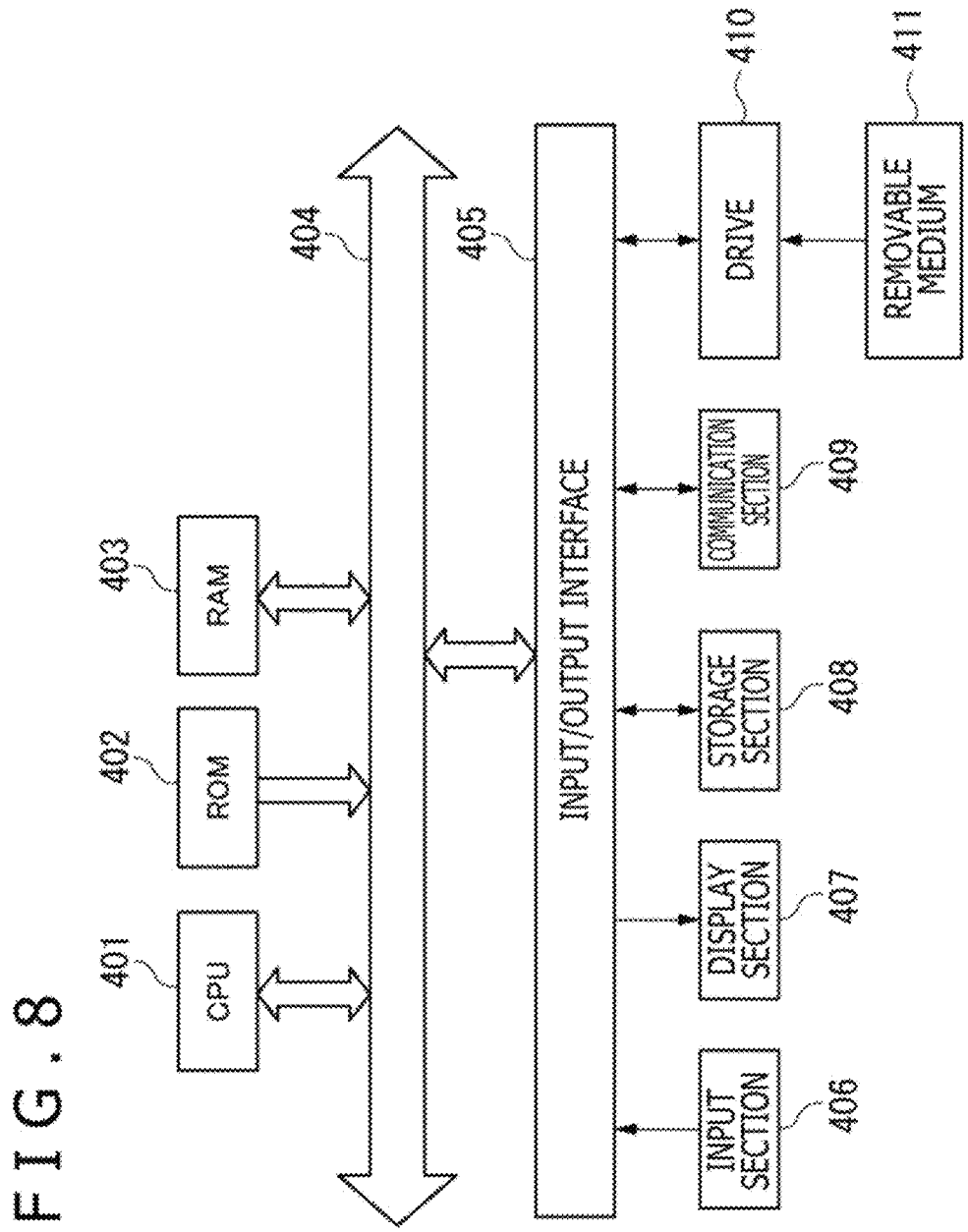
FIG. 8 is a block diagram depicting an example of a configuration of a computer.

FIG. 8 is a block diagram depicting an example of a configuration of hardware of a computer which executes the series of processing described above in accordance with a program.

In a computer, a CPU (Central Processing Unit) 401, a ROM (Read Only Memory) 402, and a RAM (Random Access Memory) 403 are connected to one another through a bus 404.

An input/output interface 405 is further connected to the bus 404. An input section 406, an output section 407, a recording section 408, a communication section 409, and a drive 410 are connected to the input/output interface 405.

The input section 406 includes an input switch, a button, a microphone, an imaging element, or the like. The output section 407 includes a display, a speaker, or the like. The recording section 408 includes a hard disc, a non-volatile memory, or the like. The communication section 409 includes a network interface or the like. The drive 410 drives a removable recording medium 411 such as a magnetic disc, an optical disc, a magneto-optical disc or a semiconductor memory.

In the computer configured in the manner as described above, the CPU 401, for example, loads a program stored in the recording section 408 into the RAM 403 via the input/output interface 405 and the bus 404, and executes the program, thereby executing the series of processing described above.

The program which is to be executed by the computer (CPU 401), for example, can be recorded in the removable recording medium 411 as a package medium or the like to be provided. In addition, the program can be provided via a wired or wireless transmission medium such as a local area network, the Internet, or digital satellite broadcasting.

In the computer, the drive 410 is equipped with the removable recording medium 411, thereby enabling the program to be installed in the recording section 408 via the input/output interface 405. In addition, the program can be received at the communication section 409 and can be installed in the recording section 408 via a wired or wireless transmission medium. Further, the program can be previously installed in the ROM 402 or the recording section 408.

It should be noted that the program which is to be executed by the computer may be a program in accordance with which the processes are executed along the order described in the present description, or may be a program in which the processes are executed in parallel to one another or at a necessary timing when a call is made, or the like.

In addition, the embodiments of the present technology are by no means limited to the embodiments described above, and various changes can be made without departing from the subject matter of the present technology.

For example, the present technology can adopt a configuration of cloud computing in which one function is processed so as to be jointly shared among a plurality of apparatuses via a network.

In addition, the steps described in the above flow charts can be executed by not only a single apparatus but also a plurality of apparatuses in a shared manner.

Moreover, in the case where a plurality of processes is included in one step, the plurality of processes included in one step can be executed by not only a single apparatus but also a plurality of apparatuses in a shared manner.

Example of Combinations of Configurations

The present technology can also adopt the following configurations.

(1)

An information processing apparatus including:

a map generating section generating map data associated with a circumference of a vehicle, and updating the map data in conformity with a movement of the vehicle; and a waiting space detecting section detecting a waiting space as a space enabling the vehicle to wait on a basis of the map data, and generating waiting space information as information associated with the detected waiting space and used in setting of an escaping route on which the vehicle is escaped in order to pass an oncoming vehicle.

(2)

The information processing apparatus according to (1) described above, in which the waiting space detecting section detects the waiting space in a road in which it is difficult to pass the oncoming vehicle.

(3)

The information processing apparatus according to (2) described above, in which the waiting space detecting section, after the vehicle passes the road, erases the waiting space information associated with the waiting space in the road.

(4)

The information processing apparatus according to any one of (1) to (3) described above, further including:

an action planning section setting the escaping route on a basis of the waiting space information.

(5)

The information processing apparatus according to (4) described above, in which the action planning section sets the escaping route further on the basis of the map data.

(6)

The information processing apparatus according to (4) or (5) described above, in which the waiting space detecting section stores the waiting space information associated with a plurality of the waiting spaces, and the action planning section selects the waiting space enabling the vehicle to pass the oncoming vehicle, from the plurality of the waiting spaces.

(7)

The information processing apparatus according to any one of (4) to (6) described above, further including:

an operation controlling section controlling the vehicle in such a way as to cause the vehicle to pass the escaping route to be escaped in the waiting space.

(8)

The information processing apparatus according to (7) described above, in which the action planning section performs control so as to notify in advance that the vehicle is to be escaped.

(9)

The information processing apparatus according to any one of (4) to (8) described above, further including:

a communication section communicating with the oncoming vehicle, in which the action planning section decides which of the vehicle and the oncoming vehicle is escaped between the vehicle and the oncoming vehicle.

(10)

The information processing apparatus according to any one of (4) to (9) described above, in which the action planning section decides whether or not escape is performed in accordance with an inputted instruction.

(11)

The information processing apparatus according to any one of (1) to (10) described above, in which the map generating section and the waiting space detecting section perform update or erasure of the map data or the waiting space information at independent timings.

(12)

The information processing apparatus according to any one of (1) to (11) described above, in which the map data includes a map within a predetermined range with the vehicle as a reference.

(13)

The information processing apparatus according to (12) described above, in which the map data is an occupancy grid map.

(14)

An information processing method including:

a map generating step of generating map data associated with a circumference of a vehicle, and updating the map data in conformity with a movement of the vehicle; and a waiting space detecting step of detecting a waiting space as a space enabling the vehicle to wait on a basis of the map data, and generating waiting space information as information associated with the detected waiting space and used in setting of an escaping route on which the vehicle is escaped in order to pass an oncoming vehicle.

REFERENCE SIGNS LIST

10 Vehicle controlling system, 20 Position recognition processing section, 21 Structure movement recognition processing section, 22 Object recognition processing section, 23 Situation recognition processing section, 24 Map storing section, 25 Waiting space storing section, 26 Route planning section, 27 Action planning section, 28 Communication section, 29 Display section, 30 Sound outputting section, 31 Operation planning section, 32 Operation controlling section, 33 Acceleration controlling section, 34 Deceleration controlling section, 35 Direction controlling section, 36 Gear controlling section, 101 Position detecting section, 102 Self-position estimating section, 111 Distance detecting section, 112 Moving object discriminating section, 113 Object clustering section, 121 Object detecting section, 122 Object recognizing section, 123 Object tracking section, 131 Map generating section, 132 Traffic situation recognizing section, 133 Object position speed estimating section, 134 Movement prediction section, 135 Waiting space detecting section, 201 Own vehicle, 202 Oncoming vehicle, 211 Road, 214 Waiting space

The invention claimed is:

1. An information processing apparatus comprising:
processing circuitry configured to:
generate map data associated with a circumference of a vehicle, and update the map data in conformity with a movement of the vehicle;
detect a waiting space as a space enabling the vehicle to wait on a basis of the map data, and generate waiting space information as information associated with the detected waiting space and used in setting of an escape route on which the vehicle escapes in order to pass an oncoming vehicle;
set the escape route on a basis of the waiting space information; and
decide, based on a communication with the oncoming vehicle, which of the vehicle and the oncoming vehicle is to escape.

2. The information processing apparatus according to claim 1, wherein the processing circuitry is configured to detect the waiting space in a road in which it is difficult to pass the oncoming vehicle.

3. The information processing apparatus according to claim 2, wherein the processing circuitry is configured to, after the vehicle passes the road, erase the waiting space information associated with the waiting space in the road.

4. The information processing apparatus according to claim 1, wherein the processing circuitry is configured to set the escape route further on the basis of the map data.

5. The information processing apparatus according to claim 1, wherein the processing circuitry is configured to:
store the waiting space information associated with a plurality of the waiting spaces, and
select the waiting space enabling the vehicle to pass the oncoming vehicle, from the plurality of the waiting spaces.

6. The information processing apparatus according to claim 1,
wherein the processing circuitry is configured to control the vehicle in such a way as to cause the vehicle to pass the escape route.

7. The information processing apparatus according to claim 6, wherein the processing circuitry is configured to perform control so as to notify in advance that the vehicle is to escape.

8. The information processing apparatus according to claim 1, wherein the processing circuitry is configured to decide whether or not escape is performed in accordance with an inputted instruction.

9. The information processing apparatus according to claim 1, wherein the processing circuitry is configured to perform update or erasure of the map data or the waiting space information at independent timings.

10. The information processing apparatus according to claim 1, wherein the map data includes a map within a predetermined range of the vehicle as a reference.

11. The information processing apparatus according to claim 10, wherein the map data is an occupancy grid map.

12. An information processing method performed by information processing apparatus, the method comprising:
generating map data associated with a circumference of a vehicle, and updating the map data in conformity with a movement of the vehicle;
detecting a waiting space as a space enabling the vehicle to wait on a basis of the map data, and generating waiting space information as information associated with the detected waiting space and used in setting of an escape route on which the vehicle escapes in order to pass an oncoming vehicle;
setting the escape route on a basis of the waiting space information; and
deciding, based on a communication with the oncoming vehicle, which of the vehicle and the oncoming vehicle is to escape.

13. The information processing apparatus according to claim 1, wherein the processing circuitry is configured to communicate with the oncoming vehicle.

14. The information processing method according to claim 12, the method further comprising;
communicating with the oncoming vehicle.

15. An information processing system comprising:
processing circuitry configured to:
generate map data associated with a circumference of a vehicle, and update the map data in conformity with a movement of the vehicle;
detect a waiting space as a space enabling the vehicle to wait on a basis of the map data, and generate waiting space information as information associated with the detected waiting space and used in setting of an escape route on which the vehicle escapes in order to pass an oncoming vehicle;
set the escape route on a basis of the waiting space information;
communicate with the oncoming vehicle; and
decide, based on a communication with the oncoming vehicle, which of the vehicle and the oncoming vehicle is to escape.

* * * * *